Figure 1:
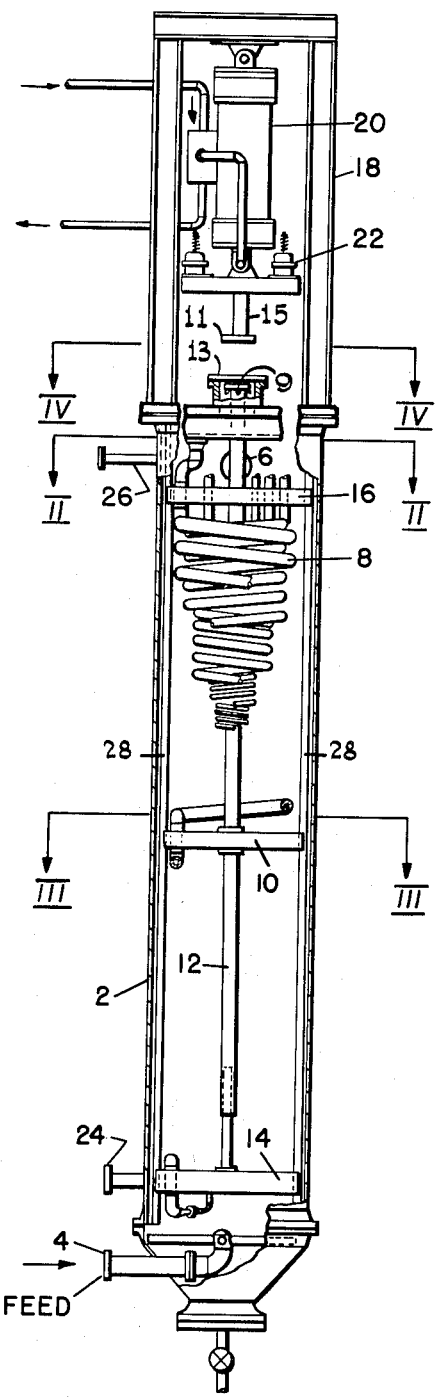

July 31, 1956

E. C. MAGEE 2,757,079

APPARATUS AND PROCESS FOR RECOVERING
COBALT FROM LIQUID ALDEHYDE

Filed March 12, 1953

EVERETT C. MAGEE INVENTOR

BY *Henry Berk* ATTORNEY

United States Patent Office 2,757,079
Patented July 31, 1956

2,757,079

APPARATUS AND PROCESS FOR RECOVERING COBALT FROM LIQUID ALDEHYDE

Everett C. Magee, Las Piedras, Venezuela, assignor to Esso Research and Engineering Company, a corporation of Delaware Application March 12, 1953, Serial No. 341,986

13 Claims. (Cl. 75—82)

The present invention relates to an improved process for production of oxygenated organic compounds by reaction of olefinic compounds with gas mixtures containing $H_2$ and $CO$ at high pressures and elevated temperatures in the presence of a carbonylation catalyst. More particularly, the invention is concerned with an improved method and means for removing dissolved metal carbonyl from the aldehyde product formed in the first stage of the process.

The synthesis of aldehydes and alcohols from olefinic compounds, $CO$, $H_2$, and a group VIII metal compound catalyst now is well known in the art. The olefinic feed is reacted in the liquid state with the synthesis gas in the presence of an iron group metal, particularly in the presence of cobalt or its compounds. The reaction product consists mainly of aldehydes having one more carbon atom per molecule than the olefinic feed. The aldehyde product is generally hydrogenated in a second catalytic stage to alcohol.

Practically all types of organic compounds having olefinic linkages may be used as feeds to the process. The cobalt may be present as a solid or as a salt or compound soluble in the olefin feed stock. Suitable reaction conditions include temperatures of about 150–450° F., pressures of 100–300 atmospheres, $H_2$ to $CO$ ratios of 0.5–4:1, and liquid feed rates of 0.1 to 5 v./v./hr.

Similar temperatures and pressures, and hydrogenation catalysts such as nickel, copper, tungsten or molybdenum as metals, oxides or sulfides may be employed in the hydrogenation of the aldehydes to alcohols.

The group VIII metals and their compounds used as catalysts in the first, or carbonylation stage, react with $CO$ and $H_2$ to form the metal carbonyls and hydrocarbonyls. This is particularly noticeable in the case of cobalt, the preferred and most active carbonylation catalyst. This cobalt carbonyl, which dissolves in the liquid oxygenated product, tends to decompose under low carbon monoxide partial pressures even at relatively low temperatures, and very rapidly at elevated temperatures, to form free $CO$ and metallic cobalt and other insoluble forms of that element.

It is the practice in operation of the aldehyde synthesis, or Oxo reaction, to subject the aldehyde product from the carbonylation stage to a thermal treatment in order to decompose cobalt carbonyl. This is essential, for even traces of soluble cobalt present in the feed to the subsequent hydrogenation zone will decompose in the hot preheat coils in that stage, resulting in plugging of the coils and transfer lines, and decrease in heat transfer efficiency.

There are several means available for the removal of cobalt from the aldehyde product. For instance, the total liquid effluent from the carbonylation stage may be subjected to thermal treatment in the presence of a stripping gas to remove the evolved carbon monoxide and thus hasten the reaction. Heat for the decobalting, which requires temperatures of about 200–400° F., is supplied through surfaces forming the walls of the catalyst decomposition zone, which may thus take the form of a steam-jacketed tower. Such operation has the disadvantage that metallic cobalt formed by the decomposition of the cobalt carbonyl not only precipitates in the tube, but also, tends to deposit out on the tube. Eventually, this causes plugging. Removal of the deposited cobalt often is a difficult process, because during extended heating, the soft cobalt metal deposited originally is converted into a hard scale which requires drilling to remove from tube walls.

A somewhat more satisfactory operation is obtained when the heat transfer surface is a coil immersed in the liquid to be decobalted. This prevents cobalt from forming a hard scale upon the reactor walls, but rather, it forms on the coil surface. When the scale and deposits upon the coil are sufficiently thick to interfere noticeably with heat transfer efficiency, the operation is halted, the coil is removed from the reaction vessel, and mechanical means, such as chipping and drilling, have to be employed to remove the hard cobalt scale. This type of operation not infrequently causes injury to the coil.

Both of the methods described above have been found not completely satisfactory, either as a means of removing cobalt from the aldehyde product or as a satisfactory method of maintaining efficient heat transfer surfaces available. Thus, not only were shutdowns frequent, due to the necessity of frequent cobalt removal from the equipment, but also, decobalting itself was inefficient; as much as 100–500 parts per million of cobalt were frequently left in the thermally treated aldehyde product after stripping with an inert gas, such as hydrogen or nitrogen to remove $CO$.

A considerably more satisfactory operation resulted when, instead of a thermal decomposition in the presence of hydrogen, there was substituted a thermal treatment in the presence of water, preferably liquid water. An aldehyde product having less than 5, and usually between 1–4 parts per million, is thus obtained, and the cobalt carbonyl instead of depositing substantially completely as the metal, deposits in part as a compound, such as the oxide, basic formate, formate and the like, resulting from the hydrolytic reaction taking place. These compounds also form, on standing, a hard scale upon the coil. When the deposits upon the coil are such that heat transfer is inefficient and decobalting rates drop, the unit must be shut down, the stream diverted to stand-by units, and the coil withdrawn and the deposits and scale are drilled, chipped, scraped, and otherwise removed. This is a lengthy and tedious operation, resulting in extended periods of removal from service, possibility of injury to the coil, and large man-power requirements.

It is therefore, the principal purpose of the present invention to describe a novel apparatus and process for removing cobalt which will not require removal of the heat transfer surfaces from the decobalting unit nor scraping or other manual operations for removing deposited scale.

In accordance with the present invention, decobalting is carried out by subjecting the total liquid effluent from the carbonylation stage to a thermal treatment in a tower equipped with a series of heating coils actuated as a coil spring by a connected steam, air, or hydraulic cylinder, and also, preferably by an electric or pneumatic vibrator. The coils are periodically flexed to break away deposited scale and metallic film which collect at the bottom of the tower. Descaling by flexing of the coils may be carried out while the decobalting operation is in progress, or it may be carried out in a series of thermal towers, where decobalting is being carried out in one or more towers, and the descaling in a tower temporarily out of decobalting service. In this manner, the coils need not be removed from the reaction zone nor need they be chipped, drilled, or scraped. The flexing action, which is transmitted to the coils by the shaft, as more fully described below, serves to break even the hardest scale. Spray steam or water serves to remove the loosened scale from the coils.

Having set forth its general nature, the invention will best be understood from the following more detailed description, in which reference will be made to the accompanying drawing.

Figure 4:
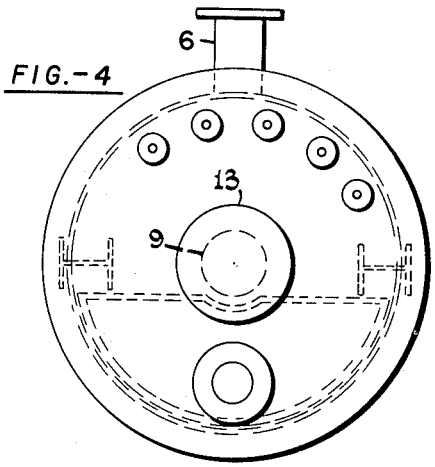
Figure 2:
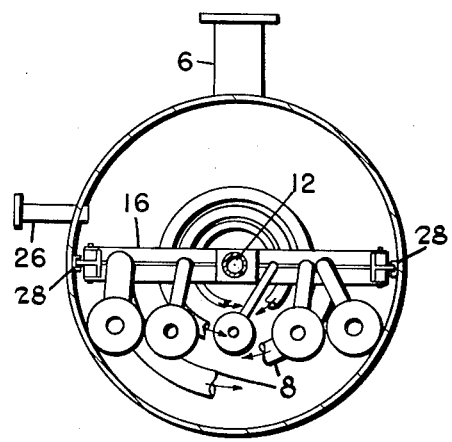
Figure 3:
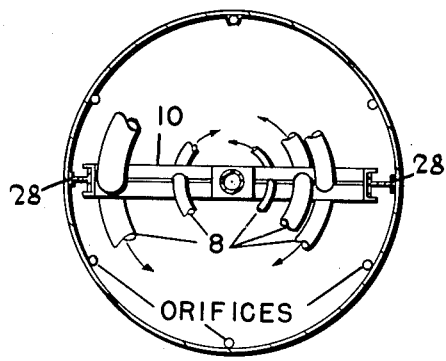

Figure 1 is a longitudinal view of the thermal tower; Figure 2 is a cross section taken through lines II—II of Figure 1; Figure 3 is a cross section taken through lines III—III of Figure 1; and Figure 4 is a cross section taken through lines IV—IV of Figure 1.

Turning now to Figure 1, 2 represents the thermal tower of the present invention to which the aldehyde feed is introduced through pipe 4, and from which decobalted feed is withdrawn through pipe 6. Extending the length of tower 2 are a series of concentric flexible coils 8. In the drawing, five coils are shown, though a greater or smaller number may be employed. The coils are attached at their midpoint to a movable crossarm 10 which is connected to shaft 12 and which is adapted to move vertically along guide elements 28, which extend along the length of the tower. The ends of the coils 8 are held rigidly and fixed by crossarms 14 and 16. Crossarms 14 and 16 are bolted to the lower and upper extremities of elements 28. The coils are held in place on crossarms 10, 14 and 16 by bolted channels.

Superimposed upon tower 2 is housing 18, which contains the mechanism for actuating and driving shaft 12. Suitable for this purpose is steam cylinder 20, to which, in the cleaning cycle, shaft 12 is attached. In normal decobalting operation, driving shaft 15 of steam cylinder 20 may be disengaged from the coil system, and shaft flange 9 of shaft 12 is then covered by nozzle flange 13. During the descaling cycle, nozzle flange 13 is removed, flange 9 is bolted to flange 11, and the coils are alternately stretched and compressed by the strokes of the shaft, imparted to the coils through cross piece 10. In another embodiment, a permanent connection is maintained between shafts 12 and 15 by a packing gland. The length of the stroke may be adjusted to give the desired degree of compression to the coils. The coil ends being fixed, the upper and lower halves of the coils are therefore alternately compressed and stretched as their midpoint moves alternately up and down from the midpoint position, thus breaking the scale. For a thermal tower having a height of about 16½ feet, a 16–20 inch piston stroke is suitable.

In a preferred embodiment of the invention, the shaft 12 and coils 8 are given a vibrating motion to loosen and remove the scale that has been cracked by the flexing motion of the coils. A particularly suitable means for imparting this vibrating motion is a pair of pulsating magnetic vibrators 22, controlled by rheostats. A vertical vibration results, which serves to dislodge the cracked cobalt solid particles from the coil.

The above described thermal tower finds its highest utility where decobalting is carried out in the presence of liquid water. It is generally desirable to have tower 2 substantially completely full of liquid. Water may be injected along with the feed through pipe 4, and additional water may be added through pipe 24. Water thus admitted is forced through orifices or rings lining the sides of vessel 2, as shown in the view along line III—III (Fig. 3) onto the coils. In particular, when the descaling operation is carried out in the absence of aldehyde product, i. e. when the tower is empty, jets of water from these outlets are allowed to spray upon the vibrating coils, serving to wash down the scale loosened by the flexing and vibrating actions imparted as heretofore described. The loosened scale which collects in the lower conical section of tower 2 may be withdrawn periodically as it accumulates. Steam outlets 26 serves to remove steam formed in the system or added subsequently.

In a system employing a plurality of coils, it is preferred to employ alternately left hand and right hand coils, with the outer coil having the largest diameter and the smallest number of turns. They may be made of any material which will not react with water or aldehyde under the operating conditions in tower 2. Preferably, they are made of seamless steel.

In the decobalting operation, the liquid aldehyde product from a carbonylation zone, containing dissolved therein relatively high concentrations of cobalt carbonyl, is pumped into thermal tower through pipe 4. Also admitted into tower 2 is a stream of liquid water, preferably at atmospheric temperatures and pressures. A temperature of 250–500° F. is maintained in tower 2 by heating coils 8 through which steam is passed; a pressure of 50–175 p. s. i. g. is maintained in vessel 2. Liquid flow is upward and a total residence time of 0.5–4 hours, based on oil flow, is maintained to achieve maximum conversion of cobalt carbonyl to solid forms of cobalt, which accumulates on the heat transfer surfaces, and which is removed in the manner heretofore described. It is advantageous to employ a plurality of these thermal towers. A total of three is convenient, and normally, two of the thermal towers are on stream while the third is idle for cleaning or descaling.

It is to be understood that the descaling operation may be carried out simultaneously with decobalting, or subsequent thereto. Other mechanical or electrical means than those enumerated may be employed to actuate the coils in order alternately to compress and expand them, thus breaking the hard scale of metal deposits. Vibration may be obtained by pneumatic as well as electrical means, and in a horizontal as well as vertical direction. Also, the descaling action may be continuous as well as intermittent, thus effectively preventing any scale from building up at all. Other modifications obvious to those skilled in the art are within the scope of the invention. Thus, flexing speed of the shaft may be varied by adjustment from 1 to 60 or more strokes per minute, so that the spring action of the coil causes oscillations in the coil; if the motion is fast enough, actual contact between the individual turns of the coil may be achieved to aid in the descaling. Also, under certain circumstances it may be sufficient to maintain but a single coil in the decobalting vessel. Also, it may be desirable to keep in permanent connection piston 15 and shaft 12, or a single shaft extending from cylinder 20 into the length of tower 2. This may readily be accomplished by means of suitable packing, packing glands and flexible seals all obvious to those skilled in the art.

What is claimed is:

1. An apparatus for decomposing and removing metallic carbonyls formed in the aldehyde synthesis reaction which comprises in combination a vertical chamber, at least one flexible heat transfer surface disposed within said chamber adapted to the deposition thereon of solids, means for flexing said surface, conduit means for introducing and removing liquids, and means for spraying jets of water upon said heat transfer surface.

2. The apparatus of claim 1 wherein a plurality of flexible heat transfer surfaces is disposed within said chamber.

3. In the apparatus of claim 2, means for imparting a vibrating motion to said heat transfer surfaces.

4. An apparatus adapted to decompose and remove cobalt carbonyl formed in the aldehyde synthesis reaction which comprises in combination a tower, a plurality of flexible concentric steam coils vertically disposed within and substantially coextensive with said tower, support means in the upper and lower portions of said tower to hold rigid the extremities of said coils, means for flexing said coils, orifices spaced along the walls of said tower adapted to spray jets of water upon said coils, conduit means for introducing and withdrawing liquids to and from said tower, and means for imparting a vibrating motion to said coils.

5. An apparatus for decomposing and removing cobalt carbonyl formed in the aldehyde synthesis reaction which comprises in combination a tower, a plurality of flexible concentric steam coils vertically disposed within and substantially coextensive with said tower, rigid support means disposed in the upper and lower portions of said tower to hold rigid the upper and lower portions of said coils, a movable support member disposed between said rigid means to hold rigid the mid-points of said coils, a movable shaft attached to said movable support member and adapted to impart a vertical motion to said movable support member and a flexing movement to said coils, means for actuating said shaft, conduit means in the upper and lower portions of said tower for adding and removing liquids, orifices spaced along the walls of said tower adapted to spray jets of water upon said coils, and means for imparting a vibrating motion of said coils.

6. The apparatus of claim 5 wherein said means for driving said shaft is a reciprocating steam driven piston.

7. The apparatus of claim 5 wherein said means for vibrating said coils is at least one pulsating magnetic vibrator.

8. A process for removing dissolved cobalt carbonyl from the liquid aldehyde product resulting from the reaction of olefinic organic compounds with CO and $H_2$ in the presence of a cobalt catalyst which comprises passing said cobalt-contaminated aldehyde product into a catalyst removal zone, passing water into said zone, maintaining in said zone at least one flexible heat transfer surface at least partially immersed in liquid, supplying heat to said liquid whereby said cobalt carbonyl is converted into insoluble forms of cobalt and whereby at least a portion of said cobalt deposits as a scale on said flexible heat transfer surface, withdrawing an aldehyde product from said zone substantially completely free from dissolved cobalt, flexing and concomitantly spraying water upon said heat transfer surface whereby deposited scale is cracked and loosened and withdrawing cobalt-comprising solids from said zone.

9. The process of claim 8 wherein a plurality of flexible heat transfer surfaces is maintained in said catalyst decomposition zone.

10. The process of claim 9 wherein the extremities of said heat transfer surfaces are maintained rigid in the upper and lower portions of said catalyst removal zone, and flexing imparted to said heat transfer surfaces by alternately compressing and stretching the upper and lower portions of said heat transfer surfaces.

11. The process of claim 9 wherein a vibrating motion is imparted to said heat transfer surfaces concomitantly with said flexing.

12. The process of claim 10 wherein descaling is carried out in the absence of aldehyde product.

13. The process of claim 10 wherein descaling is carried out concomitantly with decobalting.

References Cited in the file of this patent

UNITED STATES PATENTS

| | | |
|---|---|---|
| 1,565,304 | Bell | Dec. 15, 1925 |
| 1,644,518 | Field | Oct. 4, 1927 |
| 2,550,676 | Dalin | May 1, 1951 |
| 2,596,920 | Smith et al. | May 13, 1952 |

FOREIGN PATENTS

| | | |
|---|---|---|
| 670,898 | Great Britain | Apr. 30, 1952 |